2,899,879
CAMERA CASE

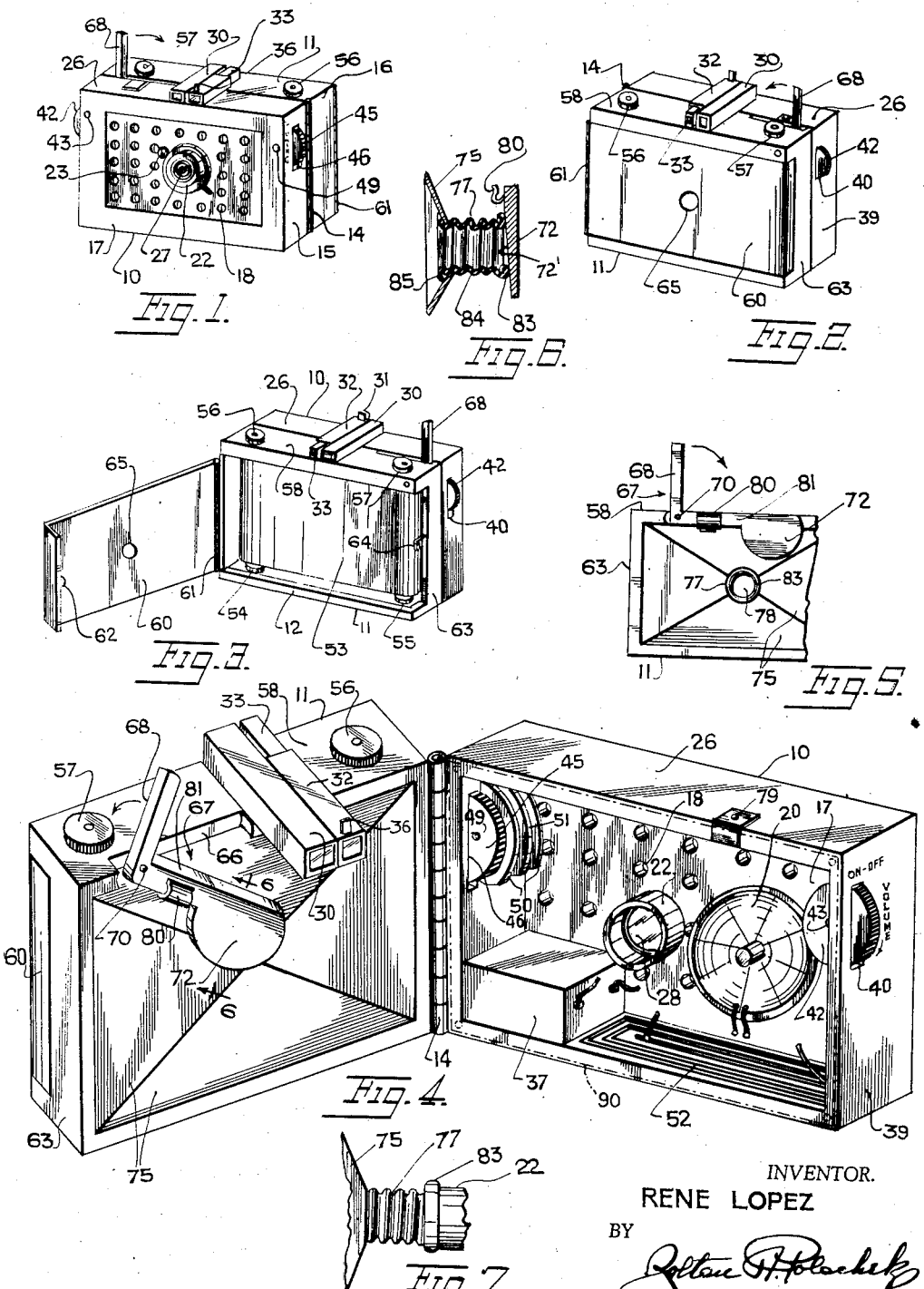

Rene Lopez, New York, N.Y.

Application July 31, 1957, Serial No. 675,371

6 Claims. (Cl. 95—11)

This invention concerns a compact camera and radio casing.

It is the main object of the invention to provide in one casing hinged compartments for containing both camera and radio components.

According to the invention there is provided a rectangular hollow casing. In the rear of the casing is provided a support for photographic film. The casing is formed in two sections arranged for hinge opening. A locking means is pivotally mounted on one section of the casing and is arranged to cover the film at the same time that it releases the other section for opening the casing. When the casing is opened access is had to radio components contained in the casing as well as to a lens mount. An exterior door is provided on the casing to provide access to the film chamber for loading with film and removing exposed film.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the casing embodying the invention showing the front and one end of the casing.

Fig. 2 is a perspective view of the casing showing the rear and the other side thereof.

Fig. 3 is a perspective view of the casing with film chamber door opened.

Fig. 4 is a perspective view of the casing with hinged sections open.

Fig. 5 is an elevational view of a portion of the rear section.

Fig. 6 is a sectional view taken on lines 6—6 of Fig. 4 of the closure means for the film compartment.

Fig. 7 is an elevational view of a portion of a lens barrel and bellows sleeve member.

Referring to the drawings, there is shown a rectangular hollow casing formed with front section 10 and rear section 11 secured together by a centrally disposed hinge 14 attached to ends 15 and 16 of the respective sections, as shown in Fig. 1. The front wall 17 has perforations or apertures 18 for passing sound emitted by loud-speaker 20 shown best in Fig. 4, and for ventilating the front compartment.

A cylindrical lens mounting 22 carrying lenses 27, 28 is fixed in and extends through wall 17. This mounting includes a control 23 at the front of the casing for snapping the shutter. On the top wall 26 of section 10 is mounted a view finder 30. Adjacent to the view finder is a telescope 31 having a front fixed section 32 and a retractable smaller section 33. A finger grip element 36 is mounted on the free end of the telescopic section 31 for moving this section. When the sections are open, as shown in Fig. 4, the telescope and view finder extend beyond the top wall 26. Inside section 10 is a battery 37 for energizing the radio. In end 39 of section 10 is a slot 40. Through this slot extends a portion of the volume control and on-off switch dial 42 of the radio. This control dial is rotatably carried on shaft 43 journalled in the front wall 17. Another dial 45 for tuning the radio extends through slot 46 in side wall 15. This dial rotates on shaft 49 journalled in wall 17. Mounted on shaft 49 are capacitor plates 50 which coact with stationary plate 51 in section 10. A loop antenna 52 is mounted on the bottom of section 10.

The camera film 53 extends across the rear of section 11. The film is carried on spools 54, 55 rotated by knobs 56, 57. The knobs are accessible at the top wall 58 of section 11. A rear door 60, mounted on a hinge 61, closes the film compartment. This door has a latch 62 which engages with a spring catch 64 on end wall 63. A red light filter 65 is mounted in the door 60 for reading film numbers on the back of the film.

The inner edge of top wall 58 has a recess 66 in which is pivotally mounted a generally L-shaped member 67. This member has an arm 68 extending upwardly from the top of the casing. The member pivots on a shaft 70 set in the wall 58. The base 72 of the member 67 has a semicircular form. The base serves as a shutter plate. Referring to Figs. 4 and 5, it will be noted that an inner wall of the film compartment in section 11 is formed by inclined wall sections 75. At the center or apex of these wall sections is a flexible tube 77 having a passage 78. The cylindrical tube 77 extends forwardly so that it can be covered by base plate 72 when the arm 68 is pivoted downwardly. When the arm 68 is erect the passage is uncovered so that a clear optical path exists from lens 28 to the sensitive face of the film 53 if the sections 10 and 11 are closed.

Referring to Fig. 6, it will be noted that the plate 72 is generally wedge-shaped in cross section with an inner side 72' normally inclined to the plane circular outer end of the tube 77. The outer end of the tube is in the form of an annular ring 83. The tube is made of rubber or flexible plastic material and embedded in the body of the tube is a coil spring 84. Thus the tube serves as a bellows which is compressed when the plate 72 is pivoted downwardly to effect a light-tight seal between the ring 83 and inclined side 72'. The tapered form of the plate 72 facilitates passage of its lower edge past the ring so that the light-tight seal is maintained under the tension in the compressed spring 84. At its inner end the tube 77 is supported in the central opening in the inclined walls 75.

In Fig. 7 the tube 77 is shown aligned with the cylindrical lens barrel 22. The ring 83 is pressed against the adjoining circular edge of the lens barrel under spring tension to effect a complete light-tight seal. This light-tight optical path is necessary because undesired light enters the front compartment via holes 18 and the film must be shielded from this light.

On wall 26 is a fixed catch 79 which has a depending lip arranged to engage in the spring latch element 80 carried on the narrow arm portion 81 of base plate 72. Thus, member 67 serves in one position to lock the sections together and uncover the film, while in the lowered position the film compartment is closed while the sections are unlocked. The coacting members 67 and 77 prevent exposure to light of the film through lens 78 when the casing is opened for servicing the radio or for removing or replacing lens mounting 22.

The casing and associated parts 30, 31, 67, etc., are preferably made of plastic material or of non-magnetic metal such as aluminum to insure optimum radio signal reception by the antenna 52.

A suitable insulation plate 90 is provided between the radio and the camera to insulate the heat present in the radio set, from the film of the camera.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A case for a camera, comprising a hollow rectangular box composed of a pair of hollow sections hinged together at one end thereof, a first camera lens mounted in the front wall of one section, a catch located on the top side of said one section, inclined wall sections in the other hollow section forming a wall of a film compartment therein, said partition having a central opening, another lens disposed in said opening and supported in optical alignment with the first lens when said sections are closed, and a generally L-shaped member pivotally supported on the top wall of said other section, said member having an upstanding arm and a base, said base having an enlarged plate portion and carrying a latch, said member being operative to cover said other lens and unlock the sections in one position thereof and to uncover said other lens and lock the sections together in another position thereof, said latch being operative to retain said arm in an erect position when said catch is engaged with said latch.

2. A case for a camera, comprising a hollow rectangular box composed of a pair of hollow sections hinged together at one end thereof, a first camera lens mounted in the front wall of one section, a catch located on the top side of said one section, the other section having a film compartment therein substantially closed by an inner wall, said inner wall having a central opening, another lens disposed in said opening and supported in optical alignment with the first lens when said sections are closed, the inner edge of the top wall of the other section having a recess therein, and a generally L-shaped member pivotally supported in said recess, said member having an upstanding arm and a base, said base having an enlarged plate form and carrying a spring latch on an arm portion thereof, said member being operative to cover said other lens and unlock the sections in one position thereof and to uncover said other lens and lock the sections together in another position thereof, said spring latch being operative to retain said arm in an erect position when said catch is engaged with said latch.

3. A case for a camera, comprising a hollow rectangular box composed of a pair of hollow sections hinged together at one end thereof, a first camera lens mounted in the front wall of one of the sections, a catch located on the top side of said one section, the other section having a film compartment therein substantially closed by an inner wall having inclined wall sections, said inner wall having a central opening, another lens disposed in said opening and supported in optical alignment with the first lens when said sections are closed, a hinged door mounted on the exterior of said other compartment to provide access to the film compartment, the inner edge of the top wall of said other section having a recess therein, and a generally L-shaped member pivotally supported in said recess, said member having an upstanding arm and a base, said base having an enlarged plate form and carrying a spring latch on an arm portion thereof, said member being operative to cover said other lens and unlock the sections in one position thereof and to uncover said other lens and lock the sections together in another position thereof, said spring latch being operative to retain said arm in an erect position when said catch is engaged with said latch.

4. A case for a camera, comprising a closed hollow box composed of a pair of sections hinged together at one end thereof, a camera lens mounted in a cylindrical barrel in the front wall of one section, said barrel extending through the wall, the other section having a film compartment therein closed by an inner wall, said inner wall having a central opening disposed in optical alignment with the lens when said sections are closed, a cylindrical bellows tube disposed in said opening, and a plate member pivotally mounted on one section, between the two sections, and adapted to cover the passage in said tube in one position of the plate member and to uncover said passage in another position of said member, said plate member providing a light-tight seal to prevent exposure of the film to light during opening of the sections.

5. A case for a camera, comprising a closed hollow box composed of a pair of sections hinged together at one end thereof, a camera lens mounted in a cylindrical barrel in the front wall of one section, said barrel extending through the wall, the other section having a film compartment therein substantially closed by inclined wall sections, said wall sections having a central opening disposed in optical alignment with the lens when said sections are closed, a cylindrical bellows tube containing a tensioning spring mounted in said opening, and a closure member pivotally mounted in said other section, said closure member being operative to form a light-tight seal of said tube and unlock said sections in one position of said member, and to uncover said passage and lock said sections together in another position thereof, said tube and barrel forming another light-tight seal under spring tension when said sections are closed.

6. A case for a camera, according to claim 5, wherein said member includes a plate portion having an inclined side, said tube being formed of flexible material and having an outer flexible ring adapted to form said light-tight seal with said inclined side.

References Cited in the file of this patent
UNITED STATES PATENTS

| | | |
|---|---|---|
| 2,143,756 | Bouveng et al. | Jan. 10, 1939 |
| 2,449,626 | Suthann | Sept. 21, 1948 |

OTHER REFERENCES

Washington Shopping News, Nov. 9, 1948, "Air King Camera-Radio."